(12) United States Patent
Harders et al.

(10) Patent No.: US 8,748,517 B2
(45) Date of Patent: Jun. 10, 2014

(54) STOCK SOLUTIONS HAVING HIGH CONCENTRATIONS OF POLYMERS BASED ON OILS OF PLANT AND/OR ANIMAL ORIGIN FOR THE PREPARATION OF BITUMEN/POLYMER COMPOSITIONS

(75) Inventors: Sylvia Harders, Buchholz (DE); Guillaume Dulac, Saint-Genis Laval (FR)

(73) Assignee: Total Raffinage Marketing, Puteaux (FR)

( * ) Notice: Subject to any disclaimer, the term of this patent is extended or adjusted under 35 U.S.C. 154(b) by 0 days.

(21) Appl. No.: 13/501,920

(22) PCT Filed: Oct. 14, 2010

(86) PCT No.: PCT/IB2010/054660
§ 371 (c)(1),
(2), (4) Date: Jun. 21, 2012

(87) PCT Pub. No.: WO2011/045766
PCT Pub. Date: Apr. 21, 2011

(65) Prior Publication Data
US 2012/0283365 A1   Nov. 8, 2012

(30) Foreign Application Priority Data
Oct. 14, 2009  (FR) .................................... 09 04927

(51) Int. Cl.
*C08L 95/00* (2006.01)

(52) U.S. Cl.
USPC .......................................................... 524/71

(58) Field of Classification Search
USPC .......................................................... 524/71
See application file for complete search history.

(56) References Cited

U.S. PATENT DOCUMENTS

| | | | |
|---|---|---|---|
| 4,554,313 A | | 11/1985 | Hagenbach et al. |
| 5,397,825 A | * | 3/1995 | Segrest ................. 524/270 |
| 5,604,277 A | * | 2/1997 | Osborn ................. 524/270 |
| 8,063,004 B2 | | 11/2011 | Goldman |
| 2004/0248672 A1 | * | 12/2004 | Jeon et al. ............. 473/371 |

FOREIGN PATENT DOCUMENTS

| | | |
|---|---|---|
| CA | 2 102 316 | 9/1993 |
| DE | 210 919 | 6/1984 |
| EP | 1 696 002 | 8/2006 |
| FR | 2 894 588 | 6/2007 |
| FR | 2894588 A1 * | 6/2007 |
| WO | WO 02/10284 | 2/2002 |
| WO | WO 02/10285 | 2/2002 |
| WO | WO 2007/068461 | 6/2007 |
| WO | WO 2008/077888 | 7/2008 |

OTHER PUBLICATIONS

English Translation of FR 2894588 A1. Obtained Jul. 9, 2013 at http://translationportal.epo.org/emtp/translate/?ACTION=claimsretrieval&COUNTRY=FR&ENGINE=google&FORMAT=docdb&KIND=A1&LOCALE=en_EP&NUMBER=2894588&OPS=ops.epo.org&SRCLANG=fr&TRGLANG=en.*

* cited by examiner

*Primary Examiner* — Ling Choi
*Assistant Examiner* — Lanee Reuther
(74) *Attorney, Agent, or Firm* — Harness, Dickey & Pierce, P.L.C.

(57) ABSTRACT

The present disclosure relates to a mother solution free from oil of petroleum origin including at least one oil of vegetable and/or animal origin, from 20% to 50% by mass of polymer, with respect to the mass of the mother solution, with or without at least one cross-linking agent, the oil of vegetable and/or animal origin being acid, with an acid value measured according to the standard NF EN ISO 660 including between 50 and 300 mg KOH/g. This mother solution with a very high concentration of polymer is stable and does not gel and can therefore be diluted and used for preparing cross-linked bitumen/polymer compositions, then bituminous mixes.

15 Claims, No Drawings

STOCK SOLUTIONS HAVING HIGH CONCENTRATIONS OF POLYMERS BASED ON OILS OF PLANT AND/OR ANIMAL ORIGIN FOR THE PREPARATION OF BITUMEN/POLYMER COMPOSITIONS

CROSS-REFERENCE TO RELATED APPLICATIONS

This application is a National Phase Entry of International Application No. PCT/IB2010/054660, filed on Oct. 14, 2010, which claims priority to French Patent Application Serial No. 09 04 927, filed on Oct. 14, 2009, both of which are incorporated by reference herein.

TECHNICAL FIELD

The present invention belongs to the field of bitumens, in particular the field of bitumen/polymer compositions which can be used in highway and/or industrial applications. The present invention relates to a concentrated mother solution of polymer comprising an acid oil of vegetable and/or animal origin, its method of preparation and its use for preparing bitumen/polymer compositions and bituminous coatings such as bituminous mixes, surface dressings, membranes or seals, for example. The present invention also relates to a method for preparing bitumen/polymer compositions from said mother solution, the bitumen/polymer compositions obtained from this method and their use in highway applications in particular for preparing bituminous mixes. The present invention finally relates to a method for preparing bituminous mixes from said mother solution, the bituminous mixes obtained by this method and their use in highway applications for preparing surface, base and/or foundation courses.

BACKGROUND

Patent EP0096638 describes a method for preparing cross-linked bitumen/polymer compositions in particular from a mother solution consisting of a hydrocarbon oil which has a distillation range at atmospheric pressure comprised between 100° C. and 450° C., chosen from the petroleum cuts of aromatic character, petroleum cuts of naphtheno-paraffinic character, petroleum cuts of naphtheno-aromatic character, coal oils and oils of vegetable origin. The quantity of polymer in the mother solution can represent from 5% to 40% of the weight of the hydrocarbon oil. The chemical nature and the physico-chemical characteristics of the oil of vegetable origin are not specified.

Patent EP0582703 describes a method for preparing cross-linked bitumen/polymer compositions from a mother solution consisting of a hydrocarbon oil which has a distillation range at atmospheric pressure comprised between 100° C. and 600° C., chosen from the petroleum cuts of aromatic character, petroleum cuts of paraffinic character, petroleum cuts of naphtheno-paraffinic character, petroleum cuts of naphtheno-aromatic character, coal oils and oils of vegetable origin. The quantity of polymer in the mother solution can represent from 5% to 40% of the weight of the hydrocarbon oil. Once again, the chemical nature and the physico-chemical characteristics of the oil of vegetable origin are not specified.

The application WO2007068461 describes a bituminous binder comprising at least one bitumen, at least one cross-linked or non-cross-linked polymer, fluxed using a flux which is an oil of vegetable origin and in particular, a castor oil methyl ester. The bituminous binder fluxed using this castor oil methyl ester can be prepared from a mother solution comprising at least one cross-linked or non-cross-linked polymer and castor oil methyl ester. The percentage by weight of polymer with respect to the total weight of the mother solution is comprised between 1% and 30%. The Applicant company recognized that a mother solution prepared from an oil of vegetable origin such as that described in the application WO2007068461, i.e. a castor oil methyl ester, is not stable and gels during storage much more rapidly than the mother solutions according to the invention.

The application WO2008077888 describes a bituminous composition fluxed using a flux comprising at least one compound of vegetable origin and at least one hydrocarbon cut originating from the refining of crude oil. The fluxed bituminous composition can be prepared from a mother solution comprising at least one polymer and the flux based on the compound of vegetable origin and on the hydrocarbon cut originating from the refining of crude oil. The proportions by mass of flux and polymer (flux/polymer) in the mother solution vary from 10:90 to 90:10. This mother solution has the drawback of being formulated from a mixture of an oil of petroleum origin and an oil of vegetable origin and not entirely from an oil of vegetable origin like the mother solutions according to the invention.

SUMMARY

Under these circumstances, the purpose of the present invention is to propose a novel mother solution formulated entirely from an oil of vegetable and/or animal origin, this mother solution having a very high concentration of polymer and a very low viscosity, being stable during its preparation and during its storage, not gelling during its preparation and its storage over several days. The problem of gelling of the mother solutions arises when the latter have a very high concentration of polymer, all the more so when the latter have a very high concentration of cross-linked polymer. Gelling results in its being impossible to handle and dilute the mother solutions and consequently results in its being impossible to formulate bitumen/polymer compositions, in particular cross-linked, from these mother solutions. The Applicant company recognized that a mother solution with a very high concentration of polymer, can be formulated entirely from an oil of vegetable and/or animal origin without a gelling phenomenon when the oil of vegetable and/or animal origin is chosen from the oils of vegetable and/or animal origin of acid nature. Thus, the Applicant company recognized that not all oils of vegetable and/or animal origin allow the formulation of a mother solution with a very high concentration of polymer, which is stable and does not gel, whereas the selection of a particular oil of vegetable and/or animal origin of acid nature leads to mother solutions with a very high concentration of polymer, which are stable and do not gel over several days.

The Applicant company also recognized that the mother solutions formulated from these acid oils of vegetable and/or animal origin have a low viscosity and can therefore be pumped using standard pumping systems. Finally, the Applicant company recognized that these mother solutions can be easily diluted in bitumen, and once diluted in bitumen, lead to bitumen/polymer compositions having a good consistency, in particular in terms of penetrability and Ring and Ball temperature, good elastic recovery and good traction properties. The mother solutions according to the invention thus allow the reduction of the transport and logistics costs, since these mother solutions which are stable and have a very high concentration of polymer can be stored and transported without a gelling phenomenon and can subsequently be diluted on the bitumen production site. Thus, the transport of large quantities of bitumen/polymer compositions is avoided, the bitumen being located on the production site. Only stable and non-gelled mother solutions are stored and transported.

The invention relates to a mother solution free from oil of petroleum origin comprising at least one oil of vegetable and/or animal origin, from 20% to 50% by mass of polymer, with respect to the mass of the mother solution, with or without at least one cross-linking agent, said oil of vegetable and/or animal origin being acid, with an acid value measured according to the standard NF EN ISO 660 comprised between 50 and 300 mg KOH/g. Preferably, the oil of vegetable and/or animal origin comprises at least 50% by mass of fatty acids in the free form, with respect to the mass of the oil of vegetable and/or animal origin, preferably at least 60%, more preferentially at least 70%, even more preferentially at least 80%, even more preferentially at least 90%, even more preferentially at least 95%, even more preferentially at least 99%.

Preferably, the oil of vegetable and/or animal origin has an acid value measured according to the standard NF EN ISO 660 comprised between 60 and 250 mg KOH/g, more preferentially between 80 and 230, even more preferentially between 100 and 200, even more preferentially between 120 and 198, even more preferentially between 140 and 196. Preferably, the oil of vegetable and/or animal origin is chosen from the Tall oil or rapeseed oil fatty acids, alone or in a mixture. Preferably, the mother solution comprises 25% to 45% by mass of polymer, with respect to the mass of the mother solution, preferentially 30% to 40%, even more preferentially 32% to 35%.

Preferably, the mother solution comprises a polymer which is a styrene and butadiene copolymer and a cross-linking agent. Preferably, the polymer is a styrene and butadiene copolymer having a content of 1,2 double-bond units originating from the butadiene comprised between 5% and 50% by mass, with respect to the total mass of the butadiene units, preferably between 10% and 40%, more preferentially between 15% and 30%, even more preferentially between 20% and 25%, with or without cross-linking agent.

The invention also relates to a method for preparing a mother solution as defined above in which at least one acid oil of vegetable and/or animal origin, at least 20% by mass of polymer, with respect to the mass of the mother solution with or without at least one cross-linking agent are brought into contact between 120° C. and 220° C. for a period of 1 hour to 48 hours. The invention also relates to the use of a mother solution as defined above for preparing a bitumen/polymer composition.

The invention also relates to a method for preparing a bitumen/polymer composition by dilution between 120° C. and 220° C., over a period of 10 minutes to 48 hours, of a mother solution obtained as defined above in at least one bitumen, the final concentration of polymer in the bitumen/polymer composition being comprised between 0.5% and 15% by mass, with respect to the mass of the bitumen/polymer composition. The invention also relates to a bitumen/polymer composition capable of being obtained by the above method. The invention also relates to the use of a bitumen/polymer composition as defined above in a mixture with aggregates in order to produce a bituminous mix.

The invention also relates to a method for preparing a bituminous mix by diluting a mother solution as defined above in at least one bitumen, between 120° C. and 220° C., over a period of 10 minutes to 48 hours, the final concentration of polymer in the bitumen/polymer composition being comprised between 0.5% and 15% by mass, with respect to the mass of the bitumen/polymer composition, then mixing said bitumen/polymer composition with aggregates, between 120° C. and 220° C. The invention also relates to a bituminous mix capable of being obtained by the above method. The invention also relates to the use of a bituminous mix as defined above in order to produce surface, base and/or foundation courses.

DETAILED DESCRIPTION

In order to obtain a mother solution with a very high concentration of polymer which is stable during storage and does not gel, the mother solution according to the invention comprises at least one oil of vegetable and/or animal origin, this oil of vegetable and/or animal origin being of acid nature. By "acid nature", is meant an oil of vegetable and/or animal origin comprising a large quantity of fatty acids in the free form and consequently an oil of vegetable and/or animal origin having a high acid value.

There are three major categories of oils, classified according to their origin: oils of vegetable origin, oils of animal origin and oils of mineral origin. By oil of mineral origin is meant oils obtained by the distillation of coal, petroleum or certain bituminous shales. The mother solution according to the invention is free from oil of mineral origin. In fact, it is desirable for environmental reasons to formulate mother solutions comprising only renewable compounds such as those of vegetable and/or animal origin. The mother solution according to the invention can, in the event of contamination, comprise traces or impurities of oil of mineral origin. In this case, the mother solution comprises less than 5% by mass of oil of mineral origin, with respect to the mass of the mother solution, preferably less than 2%, more preferentially less than 1%, even more preferentially less than 0.5%. Such traces or impurities of mineral oil could originate from contamination by a mixture of another nature utilized in the reactors or storage tanks conventionally used, this other mixture using an oil of mineral origin.

The mother solution according to the invention therefore comprises only oil of vegetable origin, oil of animal origin or a mixture of the two. The origin of the oil of vegetable origin is not determinant for the invention, and neither is the oil of animal origin. It is thus possible to use any known source of oil of vegetable and/or animal origin. By way of example, there can be mentioned bee, almond, peanut, avocado, babassu, whale, baobab, butter, China wood, borage, cocoa, camelina, carnauba, safflower, chaulmoogra, horse, coconut, rapeseed, copra, cotton, sea kale, croton, marrow, cuphea, euphoria lathyris, wheatgerm, herring, illipe, jojoba, shea, lanolin, lesquerela, lignite, limnanthes alba, linseed, alfalfa, macadamia, corn, menhaden, cod-liver, mustard, hazelnut, nut, low erucic acid rapeseed, kernel, poppy-seed, goose, oitica, olive, evening primrose, bone, palm, palm kernel, grape seed, perilla, neat's foot, dogfish, castor, rice, lard, sardine, rye, sesame, soya, suet, Tall (Tall Oil) and/or sunflower oils alone or in mixtures.

Preferably, the oil of vegetable and/or animal origin is an oil of vegetable origin and is preferably chosen from soya, palm, rapeseed, sunflower, cotton and Tall oils, as these oils are mass-produced, with a preference for Tall oil which is obtained from paper and which is therefore not an oil intended for the food industry. The oils of vegetable and/or animal origin can be used in the form of a crude oil, a semi-refined oil, a refined oil or be co-products of a refined or semi-refined oil. By refined or semi-refined oil, or co-products of a refined or semi-refined oil, is meant products which have been subjected to chemical and/or physical refining. The chemical and/or physical refining operations include mucilage removal, degumming, neutralization, bleaching, drying, filtration, deodorization. The oils of vegetable and/or animal origin according to the invention may also have been modified by chemical reactions, such as esterification or hydrogenation reactions.

The oils of vegetable and/or animal origin according to the invention are mainly constituted by saturated, mono-unsaturated and/or poly-unsaturated fatty acids. The fatty acids, depending on the origin of the oil, are fatty acids comprising 8 to 24 carbon atoms, preferably 10 to 22 carbon atoms, more preferentially 14 to 20 carbon atoms, even more preferentially 16 to 18 carbon atoms. Oils comprising a majority of fatty acids with 18 carbon atoms are preferred, i.e. oils comprising 65% to 95% by mass of fatty acids with 18 carbon atoms with respect to the mass of the oil, preferably 70% to 90%, more preferentially 75% to 85%. The oils of vegetable and/or animal origin according to the invention may also comprise resin acids and/or unsaponifiable neutral products, particularly when the oil according to the invention is chosen from the Tall oils.

Preferably, the oil of vegetable and/or animal origin according to the invention is chosen from the Tall Oil Fatty Acids, (TOFA), a Tall oil cut which is very rich in fatty acids in the free form and very acid. Similarly, preferably, the oil of vegetable and/or animal origin is chosen from the rapeseed oil fatty acids, a rapeseed oil cut which is very rich in fatty acids in the free form and very acid.

The fatty acids of the oils of vegetable and/or animal origin according to the invention are in the form of triglycerides, diglycerides, monoglycerides and/or in the free form. The oil of vegetable and/or animal origin according to the invention being of acid nature, it comprises a large quantity of fatty acids in the free form, i.e. non-esterified fatty acids, which allows the mother solution to have a particularly high concentration of polymer with no gelling phenomenon.

Preferably, the oil of vegetable and/or animal origin according to the invention comprises at least 50% by mass of fatty acids in the free form, with respect to the mass of said oil of vegetable and/or animal origin, more preferentially at least 60%, even more preferentially at least 70%, even more preferentially at least 80%, even more preferentially at least 90%, even more preferentially at least 95%, even more preferentially at least 99%. Preferably, the oil of vegetable and/or animal origin according to the invention comprises 50% to 100% by mass of fatty acids in the free form, with respect to the mass of oil of vegetable and/or animal origin, preferably 60% to 99%, more preferentially 70% to 95%, even more preferentially 80% to 90%.

The oil of vegetable and/or animal origin according to the invention has an acid value measured according to the standard NF EN ISO 660 comprised between 50 and 300 mg KOH/g, preferably between 60 and 250, more preferentially between 80 and 230, even more preferentially between 100 and 200, even more preferentially between 120 and 198, even more preferentially between 140 and 196, even more preferentially between 160 and 195, even more preferentially between 180 and 190. Preferably, the oil of vegetable and/or animal origin according to the invention has an iodine value measured according to the standard NF EN ISO 3961 comprised between 50 and 200 g $I_2$/100 g, preferably between 80 and 150, more preferentially between 100 and 130.

The mother solution according to the invention comprises at least one polymer. The polymers which can be used in the method according to the invention are the polymers which can be used in a standard fashion in the field of bitumens/polymers such as for example the polybutadienes, polyisoprenes, butyl rubbers, polyacrylates, polymethacrylates, polychloroprenes, polynorbornenes, polybutenes, polyisobutenes, polyethylenes, ethylene and vinyl acetate copolymers, ethylene and methyl acrylate copolymers, ethylene and butyl acrylate copolymers, ethylene and maleic anhydride copolymers, ethylene and glycidyl methacrylate copolymers, ethylene and glycidyl acrylate copolymers, ethylene and propene copolymers, ethylene/propene/diene terpolymers (EPDM), acrylonitrile/butadiene/styrene terpolymers (ABS), ethylene/alkyl acrylate or methacrylate/glycidyl acrylate or methacrylate terpolymers and in particular ethylene/methyl acrylate/glycidyl methacrylate terpolymer and ethylene/alkyl acrylate or methacrylate/maleic anhydride terpolymers and in particular ethylene/butyl acrylate/maleic anhydride terpolymer.

The preferred polymers are copolymers based on conjugated diene units and aromatic monovinyl hydrocarbon units. In fact, these polymers can be cross-linked and can consequently lead to mother solutions comprising a cross-linked polymer, then to cross-linked bitumen/polymer compositions having good elastic recovery and traction properties. The conjugated diene of the polymer according to the invention is chosen from those comprising 4 to 8 carbon atoms, such as 1,3 butadiene(butadiene), 2-methyl-1,3-butadiene(isoprene), 2,3-dimethyl-1,3-butadiene, 1,3-pentadiene, 1,2-hexadiene, chloroprene, carboxylated butadiene and/or carboxylated isoprene. Preferably, the conjugated diene is butadiene. The aromatic monovinyl hydrocarbon of the polymer according to the invention is chosen from styrene, o-methyl styrene, p-methyl styrene, p-tert-butylstyrene, 2,3 dimethyl-styrene, α-methyl styrene, vinyl naphthalene, vinyl toluene, and/or vinyl xylene. Preferably, the monovinyl hydrocarbon is styrene.

More particularly, the polymer according to the invention consists of one or more copolymers chosen from the aromatic monovinyl hydrocarbon and conjugated diene, in particular styrene and butadiene copolymers, linear or star-shaped, in diblock, triblock and/or multibranched form, optionally with or without a random hinge, preferably with a random hinge. Preferably the polymer is an aromatic monovinyl hydrocarbon and conjugated diene diblock copolymer, in particular a styrene and butadiene diblock copolymer. The aromatic monovinyl hydrocarbon and conjugated diene in particular styrene and butadiene copolymer, advantageously has a content by weight of aromatic monovinyl hydrocarbon, in particular of styrene ranging from 5% to 50% by mass, with respect to the mass of copolymer, preferably from 20% to 40%. The aromatic monovinyl hydrocarbon and conjugated diene, in particular styrene and butadiene, copolymer advantageously has a content by weight of conjugated diene, in particular butadiene, ranging from 50% to 95% by mass, with respect to the mass of copolymer, preferably from 60% to 80%.

Among these conjugated diene units, a distinction is drawn between the 1,4 double bond units originating from the conjugated diene and the 1,2 double bond units originating from the conjugated diene. By 1,4 double bond units originating from the conjugated diene, is meant the units obtained via a 1,4 addition during the polymerisation of the conjugated diene. By 1,2 double bond units originating from the conjugated diene, is meant the units obtained via a 1,2 addition during the polymerization of the conjugated diene. The result of this 1,2 addition is a so-called "pendant" vinyl double bond.

Preferably, the aromatic monovinyl hydrocarbon and conjugated diene, in particular styrene and butadiene, copolymer has a content of 1,2 double bond units originating from the conjugated diene, in particular originating from the butadiene, comprised between 5% and 50% by mass, with respect to the total mass of the conjugated diene, in particular butadiene, units, preferably between 10% and 40%, more preferentially between 15% and 30%, even more preferentially between 20% and 25%, even more preferentially between 18% and 23%. Thanks to these 1,2 double bond units originating from the conjugated diene, in particular thanks to these 1,2 double bond units originating from the butadiene, the aromatic monovinyl hydrocarbon and conjugated diene copolymer, in particular the styrene and butadiene copolymer, can be cross-linked without the use of a cross-linking agent. The aromatic monovinyl hydrocarbon and conjugated diene copolymer, in particular the styrene and butadiene copolymer, is "self-cross-linking", the copolymer branches are cross-linked, linked with each other via these so-called "pendant" vinyl double bonds. The use of a copolymer having a large quantity of so-called "pendant" vinyl double bonds makes it possible to dispense with the use of a cross-linking agent based on sulphur for example and consequently allows cross-linking without releases of hydrogen sulphide.

The aromatic monovinyl hydrocarbon and conjugated diene, in particular styrene and butadiene, copolymer has an average molecular mass $M_W$ comprised between 10,000 and 500,000 daltons, preferably between 50,000 and 200,000, more preferentially between 80,000 and 150,000, even more preferentially between 100,000 and 130,000, even more preferentially between 110,000 and 120,000. The molecular mass of the copolymer is measured by GPC chromatography with a polystyrene standard according to the standard ASTM D3536.

The mother solution according to the invention thanks to the presence of the oil of vegetable and/or animal origin of acid character, can have a much higher concentration of polymer than the mother solutions of the prior art, without gelling during their preparation and their storage. The mother solution according to the invention comprises at least 20% by mass of polymer, with respect to the mass of the mother solution, preferably at least 30%, and according to an embodiment more preferentially at least 40%. The mother solution according to the invention comprises 20% to 50% by mass of polymer, with respect to the mass of the mother solution, preferably 25% to 45%, more preferentially 30% to 40%, even more preferentially 32% to 35% and there is no gelling phenomenon during its preparation and/or its storage.

Preferably, the polymer is chosen from the cross-linkable polymers such as the styrene and butadiene copolymers, i.e. polymers that can be cross-linked by adding cross-linking agents such as sulphur or polymers which, when submitted to specific conditions such as temperatures, can change from a non-cross-linked state to a cross-linked state, in order to obtain cross-linked bitumen/polymer compositions having good consistency (penetrability and Ring and Ball temperature), elastic recovery and traction properties. Cross-linkable polymers are thus at the beginning non cross-linked, already cross-linked polymers such as rubber powders are not preferred. In the present case, a cross-linking agent can be used in order to ensure and/or facilitate the cross-linking. This cross-linking agent can be very varied in nature and is chosen as a function of the type or types of polymer(s) contained in the mother solution according to the invention.

Preferably, the cross-linking agent is chosen from sulphur and the hydrocarbyl polysulphides, alone or in a mixture, optionally in the presence of sulphur-donor or non-sulphur- donor vulcanization accelerators, alone or in a mixture. The sulphur is in particular flowers of sulphur or also alpha crystallized sulphur.

The hydrocarbyl polysulphides are for example chosen from the dihexyl disulphides, dioctyl disulphides, didodecyl disulphides, ditertiododecyl disulphides, dihexadecyl disulphides, dihexyl trisulphides, dioctyl trisulphides, dinonyl trisulphides, ditertiododecyl trisulphides, dihexadecyl trisulphides, diphenyl trisulphides, dibenzyl trisulphides, dihexyl tetrasulphides, dioctyl tetrasulphides, dinonyl tetrasulphides, ditertiododecyl tetrasulphides, dihexadecyl tetrasulphides, diphenyl tetrasulphides, orthotolyl tetrasulphides, dibenzyl tetrasulphides, dihexyl pentasulphides, dioctyl pentasulphides, dinonyl pentasulphides, ditertiododecyl pentasulphides, dihexadecyl pentasulphides, dibenzyl pentasulphides or diallyl pentasulphides, alone or in a mixture. The sulphur-donor vulcanization accelerators can be chosen from the thiuram polysulphides, such as for example, the tetrabutylthiuram disulphides, tetraethylthiuram disulphides and tetramethylthiuram disulphides, dipentamethylenethiuram disulphides, dipentamethylenethiuram tetrasulphides or dipentamethylenethiuram hexasulphides, alone or in a mixture.

The non-sulphur-donor vulcanization accelerators which can be used according to the invention can be chosen in particular from mercaptobenzothiazole and its derivatives, dithiocarbamates and derivatives, and thiuram monosulphides and derivatives, alone or in a mixture. There may be mentioned as examples of non-sulphur-donor vulcanization accelerators, zinc 2-mercaptobenzothiazole, zinc benzothiazole thiolate, sodium benzothiazole thiolate, benzothiazyl disulphide, copper benzothiazole thiolate, benzothiazyl N,N'-diethyl thiocarbamyl sulphide and benzothiazole sulphenamides such as 2-benzothiazole diethyl sulphenamide, 2-benzothiazole pentamethylene sulphenamide, 2-benzothiazole cyclohexyl sulphenamide, N-oxydiethylene 2-benzothiazole sulphenamide, N-oxydiethylene 2-benzothiazole thiosulphenamide, 2-benzothiazole dicyclohexyl sulphenamide, 2-benzothiazole diisopropyl sulphenamide, 2-benzothiazole tertiobutyl sulphenamide, bismuth dimethyl dithiocarbamate, cadmium diamyl dithiocarbamate, cadmium diethyl dithiocarbamate, copper dimethyl dithiocarbamate, lead diamyl dithiocarbamate, lead dimethyl dithiocarbamate, lead pentamethylene dithiocarbamate, selenium dimethyl dithiocarbamate, tellurium diethyl dithiocarbamate, zinc diamyl dithiocarbamate, zinc dibenzyl dithiocarbamate, zinc diethyl dithiocarbamate, zinc dimethyl dithiocarbamate, zinc dibutyl dithiocarbamate, zinc pentamethylene dithiocarbamate, dipentamethylene thiuram monosulphide, tetrabutyl thiuram monosulphide, tetraethyl thiuram monosulphide and tetramethyl thiuram monosulphide, alone or in a mixture.

The cross-linking agent can also be chosen from the compounds of general formula HS—R—SH where R represents a saturated or unsaturated, linear or branched hydrocarbon group with 2 to 40 carbon atoms, optionally comprising one or more heteroatoms, such as oxygen. Among the compounds corresponding to this general formula, there can be mentioned for example 1,2 ethanedithiol, 1,3 propanedithiol, 1,4 butanedithiol, 1,5 pentanedithiol, 1,6 hexanedithiol, 1,7 heptanedithiol, 1,8 octanedithiol, bis-(2-mercaptoethyl)ether, bis-(3-mercaptoethyl)ether, bis-(4-mercaptoethyl)ether, (2-mercaptoethyl)(3-mercaptobutyl)ether, (2-mercaptoethyl)(4-mercaptobutyl)ether, 1,8-dimercapto-3,6-dioxaoctane, benzene-1,2-dithiol, benzene-1,3-dithiol, benzene-1,4-dithiol or toluene-3,4-dithiol, biphenyl-4,4'-dithiol, alone or in a mixture.

In general a quantity of cross-linking agent between 0.05% and 5% by mass, with respect to the mass of mother solution, preferably between 0.1% and 2%, more preferentially between 0.2% and 1%, even more preferentially between 0.3% and 0.5% is used. Preferably, the quantities of polymer and cross-linking agent are fixed so as to obtain a polymer/cross-linking agent ratio comprised between 50:1 and 150:1, preferably between 60:1 and 100:1, more preferentially between 70:1 and 80:1.

When no cross-linking agent is used, an aromatic monovinyl hydrocarbon and conjugated diene copolymer are preferably used, in particular a styrene and butadiene copolymer, having a content of 1,2 double bond units originating from the conjugated diene, in particular a content of 1,2 double bond units originating from the butadiene, as defined above. An aromatic monovinyl hydrocarbon and conjugated diene copolymer, in particular a styrene and butadiene copolymer, will therefore be used with one of the cross-linking agents described above or only an aromatic monovinyl hydrocarbon and conjugated diene copolymer, in particular a styrene and butadiene copolymer having the particular quantity defined above of 1,2 double bond units originating from the conjugated diene, in particular of 1,2 double bond units originating from the butadiene, or an aromatic monovinyl hydrocarbon and conjugated diene copolymer, in particular a styrene and butadiene copolymer, having the particular quantity defined above of 1,2 double bond units originating from the conjugated diene, in particular of 1,2 double bond units originating from the butadiene optionally in combination with one of the cross-linking agents described above in order to reinforce and accelerate the cross-linking.

Moreover, the Applicant company recognized that the choice of this particular oil of acid nature made it possible to promote and accelerate the cross-linking of the polymer in the mother solution. Bitumen/polymer compositions prepared from mother solutions based on oils of vegetable and/or animal origin of non-acid nature, polymer and cross-linking agent, have not exhibited the elastic properties characteristic of the cross-linked bitumen/polymer compositions.

It is also possible to add adhesiveness additives and/or surfactants to the mother solution according to the invention. They are chosen from the alkyl amine derivatives, alkyl polyamine derivatives, alkyl amidopolyamine derivatives and quaternary ammonium salt derivatives, alone or in a mixture. The most used are the tallow propylene-diamines, tallow amido-amines, quaternary ammoniums obtained by quaternization of tallow propylene-diamines, tallow propylene-polyamines. The quantity of adhesiveness additives and/or surfactants in the mother solution according to the invention is comprised between 0.2% and 2% by mass, with respect to the mass of the mother solution, preferably between 0.5% and 1%.

In order to produce the mother solution according to the invention, the acid oil of vegetable and/or animal origin is first heated to a temperature comprised between 120° C. and 220° C., preferably between 140° C. and 200° C., more preferentially between 160° C. and 180° C. At least one polymer as defined above and optionally at least one cross-linking agent as defined above are then added, optionally under stirring, and preferably under stirring, within the abovementioned temperature ranges. The mixture is maintained within the abovementioned temperature ranges, over a duration of 1 hour to 48 hours, preferably 2 hours to 24 hours, more preferentially 4 hours to 16 hours, even more preferentially 6 hours to 12 hours, even more preferentially 8 hours to 10 hours.

In order to finally obtain cross-linked bitumen/polymer compositions, according to the method described in the previous paragraph, the following are used: either an aromatic monovinyl hydrocarbon and conjugated diene copolymer, in particular a styrene and butadiene copolymer and a cross-linking agent as defined above, or an aromatic monovinyl hydrocarbon and conjugated diene copolymer, in particular a styrene and butadiene copolymer having in particular the quantities of 1,2 double bond units originating from the conjugated diene, in particular of 1,2 double bond units originating from the butadiene defined above with or without cross-linking agent (this copolymer being able to self-cross-link alone, the cross-linking being able to be accelerated or increased by the addition of cross-linking agent), i.e. quantities of 1,2 double bond units originating from the conjugated diene, in particular of 1,2 double bond units originating from the butadiene, comprised between 5% and 50% by mass, with respect to the total mass of the conjugated diene units, in particular with respect to the total mass of the butadiene units, preferably between 10% and 40%, more preferentially between 15% and 30%, even more preferentially between 20% and 25%, even more preferentially between 18% and 23%. The abovementioned temperature and duration conditions and the choices of oil, polymer and/or cross-linking agent, allow the cross-linking of the polymer in the mother solution which can also continue and be completed during the dilution of the mother solution.

Once the mother solution has been prepared, it can be stored for several days without gelling and finally be diluted in a bitumen in order to prepare bitumen/polymer compositions, preferably cross-linked. The bitumen is first heated to a temperature comprised between 120° C. and 220° C., preferably between 140° C. and 200° C., more preferentially between 160° C. and 180° C. The mother solution according to the invention is then added, optionally under stirring, and preferably under stirring, within the abovementioned temperature ranges. The mixture is maintained within the abovementioned temperature ranges, over a duration of 10 minutes to 48 hours, preferably 30 minutes to 24 hours, more preferentially 1 hour to 16 hours, even more preferentially 2 hours to 12 hours, even more preferentially 4 hours to 8 hours.

The bitumen which can be used for diluting the mother solution according to the invention, can be a bitumen obtained from different origins. The bitumen which can be used according to the invention can be chosen from the bitumens of natural origin, such as those contained in deposits of natural bitumen, natural asphalt or bituminous sands. The bitumen which can be used according to the invention can also be a bitumen or a mixture of bitumens originating from the refining of crude oil such as bitumens from direct distillation or bitumens from distillation under reduced pressure or also blown or semi-blown bitumens, residues from deasphalting with propane or pentane, visbreaking residues, these different cuts being able to be alone or in a mixture. The bitumens used can also be bitumens fluxed by adding volatile solvents, fluxes of petroleum origin, carbochemical fluxes and/or fluxes of vegetable origin. It is also possible to use synthetic bitumens also called clear, pigmentable or colourable bitumens. The bitumen can be a bitumen of naphthenic or paraffinic origin, or a mixture of these two bitumens.

The quantities of mother solution and bitumen involved in preparing the bitumen/polymer compositions are chosen as a function of the quantity of polymer present in the mother solution and the desired quantity of final polymer in the bitumen/polymer composition. The bitumen/polymer composition generally comprises 0.5% to 15% by mass of polymer, with respect to the mass of the bitumen/polymer composition, preferably 1% to 10%, more preferentially 2% to 8%, even more preferentially 3% to 5%. Thus for example for a mother solution comprising 40% polymer, and in order to obtain a bitumen/polymer composition comprising 4% polymer, 1 part of the mother solution is diluted in 9 parts of bitumen.

Once the bitumen/polymer composition has been prepared, the latter can be mixed with aggregates in order to provide bituminous mixes which will serve to produce surface, base and/or foundation courses for the highways industry. The mixture of the bitumen/polymer composition and the aggregates takes place between 120° C. and 220° C., preferably between 140° C. and 200° C., more preferentially between 120° C. and 180° C., even more preferentially between 140° C. and 160° C. It is also possible to prepare surface dressings, membranes and seals from the bitumen/polymer compositions.

EXAMPLES

Control mother solutions and mother solutions according to the invention are prepared from:
a styrene and butadiene diblock copolymer comprising 40% by mass of styrene, with respect to the mass of the copolymer, and 6% 1,2 double bond units originating from the butadiene, with respect to the mass of butadiene and a molecular mass Mw of 97000 daltons,
flowers of sulphur, and
different oils:
a sunflower oil ($H_1$) in which the majority of the fatty acids are in the form of triglycerides, the oil comprising a maximum of 1.5% by mass of fatty acids in the free form, with respect to the mass of oil, and the acid value of which is at most equal to 1 mg KOH/g,
a linseed oil ($H_2$) in which the majority of the fatty acids is in the form of triglycerides, the oil comprising a maximum of 1.5% by mass of fatty acids in the free form, with respect to the mass of oil, and the acid value of which is at most 9 mg KOH/g,
a castor oil methyl ester ($H_3$) in which at least 75% by mass of the fatty acids are in the form of methyl ester, with respect to the mass of oil, and the acid value of which is equal to 5 mg KOH/g, this oil corresponding to the oil described in the Application WO2007068461,
a soya oil ester ($H_4$) in which the quantity of fatty acids in the free form is 2 to 3% by mass, with respect to the mass of oil, and the acid value of which is comprised between 4 and 6 mg KOH/g,
an acid rapeseed oil ($H_5$) comprising 54% by mass of fatty acids in the free form, with respect to the mass of oil, and the acid value of which is 108 mg KOH/g,
a Tall Oil Fatty Acid ($H_6$), i.e. a cut which is very rich in fatty acids originating from the distillation of Tall Oil, comprising 99.6% by mass of fatty acids in the free form, with respect to the mass of oil, and the acid value of which is comprised between 186 and 190 mg KOH/g.

The procedure used for preparing the control mother solutions and the mother solutions according to the invention is the following: one of the oils $H_1$ to $H_6$ and the copolymer described above are introduced into a reactor maintained at 185° C. and under stirring at 300 rpm. The content of the reactor is maintained at 185° C. under stirring at 300 rpm for 14 hours. Flowers of sulphur are then introduced into the reactor. The content of the reactor is maintained at 185° C. under stirring at 300 rpm for 12 hours.

The control mother solutions are the mother solutions $MS_1$ to $MS_4$, prepared respectively from the oils $H_1$ to $H_4$. The control mother solution $MS_1$ comprises 25% by mass of copolymer, 0.36% by mass of flowers of sulphur and 74.64% by mass of oil $H_1$, with respect to the mass of mother solution. The control mother solutions $MS_2$ to $MS_4$ comprise respectively 40% by mass of copolymer, 0.57% by mass of flowers of sulphur and 59.43% by mass of oil $H_2$ to $H_4$, with respect to the mass of the mother solutions.

For the control mother solutions $MS_1$ and $MS_2$ prepared respectively from the oils $H_1$ and $H_2$, a solidification, a gelling of the mother solutions was observed in the reactor. No measurement can be carried out on these two mother solutions; this is why the control mother solutions $MS_1$ and $MS_2$ do not appear in Table I below.

The mother solutions according to the invention are the mother solutions $MS_5$, $MS_{5a}$, $MS_6$ and $MS_{6a}$, prepared respectively from the oils $H_5$ and $H_6$ at two different concentrations of polymer. The mother solutions $MS_5$ and $MS_6$ contain 25% by mass of copolymer, 0.36% by mass of flowers of sulphur and 74.64% by mass of oil $H_5$ or $H_6$, with respect to the mass of the mother solutions. The mother solutions $MS_{5a}$ and $MS_{6a}$ contain 40% by mass of copolymer, 0.57% by mass of flowers of sulphur and 59.43% by mass of oil $H_5$ or $H_6$, with respect to the mass of the mother solutions.

For the mother solutions which have not gelled in the reactor, it is determined whether their viscosity at 180° C. allows them to be pumped at such a temperature and their gelling stability at 180° C. is also evaluated in a closed container placed in an oven, over a duration of 14 days. A scale from S0 to S4 makes it possible to describe whether or not the mother solution gels during storage. A state "S0" means that the mother solution is fluid, a state "S1" means that the mother solution is liquid, a state "S2" means that the mother solution is viscous, a state "S3" means that the mother solution is very viscous, a state "S4" means that the mother solution is solid, i.e. has completely gelled, that it has solidified.

Table I below shows the physical characteristics of the control mother solutions $MS_3$ and $MS_4$ and of the mother solutions according to the invention $MS_5$, $MS_{5a}$, $MS_6$ and $MS_{6a}$.

TABLE I

|  | $MS_3$ | $MS_4$ | $MS_5$ | $MS_{5a}$ | $MS_6$ | $MS_{6a}$ |
| --- | --- | --- | --- | --- | --- | --- |
| Viscosity at 180° C. (Pa · s$^{-1}$) | 0.3 | 0.4 | 0.2 | 1.7 | 0.2 | 0.4 |
| Storage 1 day | S4 | S4 | S0 | S1 | S0 | S1 |
| Storage 5 days | — | — | S0 | S2 | S0 | S2 |
| Storage 7 days | — | — | S3 | S4 | S0 | S4 |
| Storage 14 days | — | — | S4 | — | S1 | — |

It is noted that all the mother solutions can be pumped, the pumpability limit at 180° C. being 2 Pa·s$^{-1}$.

For the control mother solutions $MS_3$ and $MS_4$ prepared respectively from the oils $H_3$ and $H_4$, gelling is observed during storage after 24 hours. The mother solutions according to the invention are much less susceptible to gelling, since after 24 hours they are all fluid (S0) or liquid (S1). Gelling is observed only after 7 days in the case of the mother solutions $MS_{5a}$ and $MS_{6a}$, only after 14 days in the case of the mother solution $MS_5$ and the mother solution $MS_6$ is still liquid after 14 days.

The mother solutions according to the invention $MS_{5a}$, $MS_6$ and $MS_{6a}$, which have not gelled, are then diluted in a bitumen with a penetrability equal to 14$^1$/$_{10}$ mm and Ring and Ball temperature equal to 64.6° C. in order to provide cross-linked bitumen/polymer compositions (mixtures of the mother solutions and the bitumen) $C_{5a}$, $C_6$, $C_{6a}$. The procedure used to dilute the mother solutions according to the invention MS$_{5a}$, MS$_6$ and MS$_{6a}$ is as follows:

A bitumen is introduced into a reactor maintained at 185° C. and under stirring at 300 rpm. The content of the reactor is maintained at 185° C. under stirring at 300 rpm for 10 minutes, then the mother solution is introduced into the reactor. The content of the reactor is maintained at 185° C. under stirring at 300 rpm for 1 hour. A quantity of bitumen is added so as to obtain a concentration of polymer in the bitumen/polymer compositions C$_{5a}$, C$_6$ and C$_{6a}$ of 3.5% by mass with respect to the mass of the bitumen/polymer composition.

For the bitumen/polymer compositions C$_{5a}$, C$_6$ and C$_{6a}$, the following characteristics are determined:
(1) penetrability at 25° C. denoted P$_{25}$ (1/10 mm) measured according to the standard EN 1426,
(2) Ring and Ball temperature denoted RBSP (° C.) measured according to the standard EN 1427,
(3) Pfeiffer index denoted PI defined by the formula below:

$$PI = \frac{1952 - 500 \times \log(P_{25}) - 20 \times RBT}{50 \times \log(P_{25}) - RBT - 120}$$

(4) elastic recovery denoted ER (%) measured at 25° C. according to the standard NF EN 13398,
(5) threshold stress denoted threshold σ (MPa), maximum elongation stress denoted max ε σ (MPa), threshold elongation denoted threshold ε (%), maximum elongation denoted max ε (%), conventional energy at 400% elongation denoted E 400% (J/cm$^2$), total energy denoted total E (J), measured according to the standard NF EN 13587, the traction test being carried out at 5° C. with a stretching rate of 100 mm/minute,
(6) dynamic viscosity measured according to the standard NF EN 13702-1,
(7) storage stability, test over 3 days at 180° C. according to the standard NF EN 13399, The results are given in Table II below:

TABLE II

|  | C$_{5a}$ | C$_6$ | C$_{6a}$ |
|---|---|---|---|
| P$_{25}$ (1) | 34 | 72 | 31 |
| RBT (2) | 60.4 | 53.8 | 64.0 |
| PI (3) | 0.21 | 0.7 | 0.7 |
| Elastic recovery (4) | 67 | 51 | 65 |
| threshold σ (5) | 1.85 | 1.22 | 1.13 |
| max ε σ (5) | 0.24 | 0.10 | 0.16 |
| threshold ε (5) | 14.13 | 12.70 | 15.38 |
| max ε (5) | 564 | 430 | 520 |
| E 400% (5) | 13.18 | 10.22 | 13.12 |
| total E (5) | 2.05 | 0.98 | 1.78 |
| Viscosity at 120° C. (6) | 9.8 | — | — |
| Viscosity at 130° C. (6) | 5.8 | — | — |
| Viscosity at 140° C. (6) | 3.6 | — | — |
| Viscosity at 150° C. (6) | 2.4 | — | — |
| Viscosity at 160° C. (6) | 1.7 | — | — |
| Viscosity at 170° C. (6) | 1.3 | — | — |
| Viscosity at 180° C. (6) | 1.0 | 0.6 | 1.2 |
| Viscosity at 190° C. (6) | 0.8 | — | — |
| Δ P$_{25}$, 3 days, 180° C. (7) | 1 | — | — |
| Δ RBT, 3 days, 180° C. (7) | 0.6 | — | — |

It should be noted that the cross-linked bitumen/polymer compositions according to the invention C$_{5a}$, C$_6$ and C$_{6a}$ have good properties in terms of consistency, thermal susceptibility, elastic recovery, traction properties, viscosity and storage stability.

The invention claimed is:

1. A mother solution free from oil of petroleum origin and configured to be stored for at least 24 hours without gelling before being used to prepare a bitumen/polymer composition, the mother solution comprising at least one oil of vegetable and/or animal origin chosen from Tall oil or rapeseed oil fatty acids, alone or in a mixture, from 32% to 35% by mass of polymer which is a styrene and butadiene copolymer, with respect to the mass of the mother solution, with or without at least one cross-linking agent, the oil of vegetable and/or animal origin being acid, with an acid value measured according to the standard NF EN ISO 660 comprised between 50 and 300 mg KOH/g.

2. The mother solution according to claim 1 in which the oil of vegetable and/or animal origin comprises at least 50% by mass of fatty acids in the free form, with respect to the mass of the oil of vegetable and/or animal origin.

3. The mother solution according to claim 1 in which the oil of vegetable and/or animal origin comprises at least 60% by mass of fatty acids in the free form, with respect to the mass of the oil of vegetable and/or animal origin.

4. The mother solution according to claim 1 in which the oil of vegetable and/or animal origin comprises at least 70% by mass of fatty acids in the free form, with respect to the mass of the oil of vegetable and/or animal origin.

5. The mother solution according to claim 1 in which the oil of vegetable and/or animal origin has an acid value measured according to the standard NF EN ISO 660 comprised between 60 and 250 mg KOH/g.

6. The mother solution according to claim 1 in which the oil of vegetable and/or animal origin has an acid value measured according to the standard NF EN ISO 660 comprised between 80 and 230 mg KOH/g.

7. A mother solution free from oil of petroleum origin and configured to be stored for at least 24 hours without gelling before being used to prepare a bitumen/polymer composition, the mother solution comprising at least one oil of vegetable and/or animal origin chosen from Tall oil or rapeseed oil fatty acids, alone or in a mixture, from 32% to 35% by mass of polymer with respect to the mass of the mother solution, which is a styrene and butadiene copolymer having a content of 1,2 double bond units originating from butadiene comprised between 5% and 50% by mass with respect to the total mass of the butadiene units, with or without at least one cross-linking agent, the oil of vegetable and/or animal origin being acid, with an acid value measured according to the standard NF EN ISO 660 comprised between 50 and 300 mg KOH/g.

8. The mother solution according to claim 7 wherein the oil of vegetable and/or animal origin comprises at least 50% by mass of fatty acids in the free form, with respect to the mass of the oil of vegetable and/or animal origin.

9. The mother solution according to claim 7 wherein the oil of vegetable and/or animal origin comprises at least 60% by mass of fatty acids in the free form, with respect to the mass of the oil of vegetable and/or animal origin.

10. The mother solution according to claim 7 wherein the oil of vegetable and/or animal origin comprises at least 70% by mass of fatty acids in the free form, with respect to the mass of the oil of vegetable and/or animal origin.

11. The mother solution according to claim 7 wherein the oil of vegetable and/or animal origin has an acid value measured according to the standard NF EN ISO 660 comprised between 60 and 250 mg KOH/g.

12. The mother solution according to claim 7 wherein the oil of vegetable and/or animal origin has an acid value measured according to the standard NF EN ISO 660 comprised between 80 and 230 mg KOH/g.

13. The mother solution according to claim 7 comprising a polymer which is a styrene and butadiene copolymer having a content of 1,2 double bond units originating from butadiene comprised between 10% and 40% by mass, with respect to the total mass of the butadiene units, with or without a cross-linking agent.

14. The mother solution according to claim 7 comprising a polymer which is a styrene and butadiene copolymer having a content of 1,2 double bond units originating from butadiene comprised between 15% and 30% by mass, with respect to the total mass of the butadiene units, with or without a cross-linking agent.

15. The mother solution according to claim 7 comprising a polymer which is a styrene and butadiene copolymer having a content of 1,2 double bond units originating from butadiene comprised between 20% and 25% by mass, with respect to the total mass of the butadiene units, with or without a cross-linking agent.

* * * * *